United States Patent
Kim et al.

(10) Patent No.: US 11,384,189 B2
(45) Date of Patent: Jul. 12, 2022

(54) GRAFT COPOLYMER, AND THERMOPLASTIC RESIN COMPOSITION AND THERMOPLASTIC RESIN MOLDED ARTICLE COMPRISING THE SAME

(71) Applicant: LG CHEM, LTD., Seoul (KR)

(72) Inventors: Min Jung Kim, Daejeon (KR); Bong Keun Ahn, Daejeon (KR); Yong Yeon Hwang, Daejeon (KR); Wang Rae Joe, Daejeon (KR); Jang Won Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 547 days.

(21) Appl. No.: 16/339,308

(22) PCT Filed: Sep. 12, 2018

(86) PCT No.: PCT/KR2018/010716
§ 371 (c)(1),
(2) Date: Apr. 3, 2019

(87) PCT Pub. No.: WO2019/117433
PCT Pub. Date: Jun. 20, 2019

(65) Prior Publication Data
US 2021/0363282 A1    Nov. 25, 2021

(30) Foreign Application Priority Data

Dec. 14, 2017  (KR) .......................... 10-2017-0171962
Sep. 7, 2018   (KR) .......................... 10-2018-0107120

(51) Int. Cl.
| C08L 25/12 | (2006.01) |
| C08F 265/04 | (2006.01) |
| C08F 285/00 | (2006.01) |
| C08L 25/14 | (2006.01) |
| C08L 51/00 | (2006.01) |

(52) U.S. Cl.
CPC .......... *C08F 265/04* (2013.01); *C08F 285/00* (2013.01); *C08L 25/12* (2013.01); *C08L 25/14* (2013.01); *C08L 51/003* (2013.01); *C08L 2207/53* (2013.01)

(58) Field of Classification Search
CPC ...... C08F 265/04; C08F 285/06; C08L 25/12; C08L 25/14; C08L 51/063; C08L 2207/53
USPC ........................................................ 523/201
See application file for complete search history.

(56) References Cited

U.S. PATENT DOCUMENTS

| 4,224,419 A | 9/1980 | Swoboda et al. |
| 7,393,891 B2 | 7/2008 | O et al. |
| 9,340,637 B2 | 5/2016 | Ahn et al. |
| 9,353,255 B2 | 5/2016 | Kim et al. |
| 10,450,453 B2* | 10/2019 | Kang ...................... C08L 25/12 |
| 2005/0159529 A1 | 7/2005 | O et al. |
| 2008/0076859 A1 | 3/2008 | Eipper et al. |
| 2014/0107276 A1 | 4/2014 | Kim et al. |
| 2014/0235749 A1 | 8/2014 | Kim et al. |
| 2015/0011709 A1 | 1/2015 | Ahn et al. |
| 2018/0142094 A1 | 5/2018 | Kang et al. |
| 2018/0265687 A1 | 9/2018 | Park et al. |
| 2021/0002472 A1* | 1/2021 | Ahn ........................ C08L 51/04 |
| 2021/0024678 A1* | 1/2021 | Ahn ........................... C08F 2/26 |
| 2021/0246236 A1* | 8/2021 | Kim .......................... C08F 6/22 |

FOREIGN PATENT DOCUMENTS

| CN | 1697850 A | 11/2005 |
| CN | 103764700 A | 4/2014 |
| CN | 104066757 A | 9/2014 |
| DE | 1260135 B | 2/1968 |
| EP | 2889317 A1 | 7/2015 |
| GB | 1124911 A | 8/1968 |
| JP | 2000186124 A | 7/2000 |
| JP | 2000344841 A | 12/2000 |
| JP | 2006509101 A | 3/2006 |
| KR | 20050015396 A | 2/2005 |
| KR | 20070059088 A | 6/2007 |
| KR | 20090074979 A | 7/2009 |
| KR | 20110088803 A | 8/2011 |
| KR | 20130090307 A | 8/2013 |
| KR | 20140027872 A | 3/2014 |
| KR | 20170054644 A | 5/2017 |
| KR | 20170090765 A | 8/2017 |
| WO | WO2017099409 A1 | 6/2017 |

OTHER PUBLICATIONS

Machine Translation of JP 200186124 (Year: 2000).*
English Translation of JP 2000-186124. (Year: 2000).*
International Search Report issued in related PCT Application No. PCT/KR2018/010716 dated Dec. 17, 2018.

* cited by examiner

*Primary Examiner* — Hannah J Pak

(57) ABSTRACT

The present invention provides a graft copolymer comprising (A) a seed comprising units derived from an alkyl methacrylate monomer; (B) a core formed on the seed and comprising units derived from an alkyl acrylate monomer; and (C) a shell formed on the core and comprising units derived from one or more one or more selected from the group consisting of an aromatic vinyl-based monomer, a vinyl cyanide-based monomer and an alkyl methacrylate monomer, wherein an average particle diameter of the core is 40 to 90 nm, and a graft ratio of the shell is 10 to 30%, and a thermoplastic resin composition and a thermoplastic resin molded article including the same.

14 Claims, No Drawings

GRAFT COPOLYMER, AND THERMOPLASTIC RESIN COMPOSITION AND THERMOPLASTIC RESIN MOLDED ARTICLE COMPRISING THE SAME

CROSS-REFERENCE TO RELATED APPLICATIONS

The present application is a U.S. National Stage of PCT/KR2018/010716 filed on Sep. 12, 2018, which claims the benefit of priority based on Korean Patent Application Nos. 10-2017-0171962, filed on Dec. 14, 2017, and 10-2018-0107120, filed on Sep. 7, 2018, the entire contents of which are incorporated herein by reference.

TECHNICAL FIELD

The present invention relates to a graft copolymer, and a thermoplastic resin composition and a thermoplastic resin molded article comprising the same.

BACKGROUND ART

Generally, an ABS-based resin obtained by graft copolymerizing a diene-based rubber polymer that is prepared by polymerizing a conjugated diene-based monomer, with an aromatic vinyl monomer and a vinyl cyanide monomer, has excellent impact resistance and processability, good mechanical strength and heat deflection temperature, and favorable coloring properties, and thus, is widely used in electrical and electronic appliances, automobile parts, office machines, etc. However, the rubber polymer used for the preparation of the ABS-based resin includes chemically unstable unsaturated bonds, and thus, is easily aged by ultraviolet rays and has very weak weather resistance.

In order to improve such defects, a method of adding a stabilizer which is capable of improving weather resistance during extruding an ABS-based resin to prepare a resin composition has been suggested, but its effects are insignificant and defects relating to weakness to ultraviolet rays are still inherent. Accordingly, a method of using a polymer that is polymerized by mixing a diene-based monomer and an acrylic monomer, or using an acrylic rubber polymer that is chemically more stable than a diene-based rubber polymer including a double bond has been suggested.

The typical example of a weather-resistant thermoplastic resin using an acrylic rubber polymer not including such unstable double bonds is an acrylate-styrene-acrylonitrile (ASA) copolymer. Since unstable double bonds are not included in the polymer, weather resistance, chemical resistance, thermal stability, etc. are very excellent, and the polymer is widely used in fields requiring such properties, for example, outdoor electric and electronic parts, materials for construction, materials for agricultural implements, ASA/ABS double sheets, profile extrusion, road signs, outdoor products, PVC for building materials, equipments for leisure time, sports goods, automobile parts, etc.

A preparation method of an ASA polymer having excellent weather resistance and aging resistance is disclosed in German Patent No. 1,260,135, and a core used herein is large caliber latex of crosslinked acrylate, having an average particle diameter of 150 to 800 nm with narrow particle size distribution. A polymer including large caliber polyacrylate latex shows improved notch impact strength, high hardness and decreased contraction when compared with small caliber polyacrylate latex. However, a large caliber acrylonitrile-acrylate-styrene graft copolymer shows difficult coloring when compared with a small caliber acrylonitrile-acrylate-styrene graft copolymer.

The use of a corresponding ASA polymer to manufacture a colored molded article is limited, that is, not vivid color but blurred pastel color is achieved.

In addition, U.S. Pat. No. 4,224,419 discloses a thermoplastic resin that is easily colored and has weather resistance and high impact resistance, including a first acrylonitrile-acrylate-styrene graft copolymer, a second acrylonitrile-acrylate-styrene graft copolymer and including a core which is a hard component. The first acrylonitrile-acrylate-styrene graft copolymer includes a crosslinked acrylate polymer having an average particle diameter of about 50 to 150 nm as a core, a copolymer prepared from styrene and acrylonitrile as a graft shell. The second acrylonitrile-acrylate-styrene graft copolymer includes a crosslinked acrylate polymer having an average particle diameter of about 200 to 500 nm as a core, and a copolymer prepared from styrene and acrylonitrile as a graft shell. The hard component includes a copolymer of acrylonitrile and styrene or α-methyl styrene. Wherein the weight ratio of the core components is 90:10 to 35:65, and the total ratio of the two core components is about 10 to 35% based on a mixture.

Materials known until now have excellent weather resistance and mechanical properties and improved coloring properties. However, it is still insufficient for serving continuously increasing degrees required by customers on appearance characteristics and weather resistance.

Accordingly, the present inventors used an alkyl methacrylate-based monomer as a main component during preparing the seed of an ASA-based graft copolymer and secured the improvement of appearance characteristics and weather resistance and found that the particle diameter of a core and the graft ratio of a shell may influence the weather resistance and appearance characteristics, thereby completing the present invention.

DISCLOSURE OF THE INVENTION

Technical Problem

An object of the present invention is to provide a graft copolymer having excellent weather resistance and coloring property, and a thermoplastic resin composition and a thermoplastic resin molded article including the same.

Technical Solution

According to an aspect of the present invention, there is provided a graft copolymer comprising (A) a seed comprising units derived from an alkyl methacrylate monomer; (B) a core formed on the seed and comprising units derived from an alkyl acrylate monomer; and (C) a shell formed on the core and comprising units derived from one or more selected from the group consisting of an aromatic vinyl-based monomer, a vinyl cyanide-based monomer and an alkyl methacrylate monomer, wherein an average particle diameter of the core is 40 to 90 nm, and a graft ratio of the shell is 10 to 30%.

According to another aspect of the present invention, there is provided a thermoplastic resin composition comprising the graft copolymer; and an aromatic vinyl-vinyl cyanide-based copolymer.

According to further another aspect of the present invention, there is provided a thermoplastic resin molded article comprising the thermoplastic resin composition.

Advantageous Effects

The graft copolymer of the present invention includes alkyl methacrylate in a seed and controls the particle diameter of a core and the graft ratio of a shell to specific ranges, and shows excellent weather resistance, coloring properties and impact strength.

Therefore, a thermoplastic resin molded article manufactured by injection molding a resin composition including the graft copolymer of the present invention also shows excellent weather resistance and appearance characteristics.

BEST MODE FOR CARRYING OUT THE INVENTION

Hereinafter, the present invention will be described in more detail to assist the understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In the present disclosure, an average particle diameter ($D_{50}$) may be defined as a particle diameter corresponding to 50% of dimensional accumulation amount in a particle diameter distribution curve. For example, the average particle diameter ($D_{50}$) may be measured using a laser diffraction method. According to the laser diffraction method, in general, the measurement of a particle diameter in from a submicron region to a few mm degrees is possible, and results with high reproducibility and high resolution may be obtained.

According to an aspect of the present invention, a graft copolymer comprises (A) a seed comprising units derived from an alkyl methacrylate monomer; (B) a core formed on the seed and comprising units derived from an alkyl acrylate monomer; and (C) a shell formed on the core and comprising units derived from one or more selected from the group consisting of an aromatic vinyl-based monomer, a vinyl cyanide-based monomer and an alkyl methacrylate monomer, wherein an average particle diameter of the core is 40 to 90 nm, and a graft ratio of the shell is 10 to 30%.

Hereinafter, the preparation method of the graft copolymer of the present invention will be explained step by step in detail.

Preparation of Graft Copolymer

Preparation of (A) Seed

In the preparation step of a seed, a seed may be prepared by polymerizing an alkyl methacrylate monomer, a crosslinking agent, an initiator and an emulsifier, and selectively, one or more among an electrolyte, a grafting agent and an oxidation-reduction catalyst may be further added and polymerized.

The alkyl methacrylate monomer may be alkyl methacrylate including a chain-type alkyl or branch-type alkyl group of 1 to 10 carbon atoms, preferably, methacrylate including a chain-type alkyl group of 1 to 4 carbon atoms. Particularly, one or more selected from the group consisting of methyl methacrylate, ethyl methacrylate, propyl methacrylate, butyl methacrylate, hexyl methacrylate, octyl methacrylate, and 2-ethylhexyl methacrylate may be used.

In addition, in the seed preparation step, the alkyl methacrylate monomer may be used alone, but an alkyl acrylate monomer may be additionally used. With this, the mechanical strength of a graft copolymer may be improved.

The additionally used alkyl acrylate monomer may be acrylate including a chain-type alkyl or branch-type alkyl group of 1 to 10 carbon atoms, preferably, acrylate including a chain-type alkyl group of 1 to 4 carbon atoms. Particularly, one or more selected from the group consisting of methyl acrylate, ethyl acrylate, propyl acrylate, butyl acrylate, hexyl acrylate, octyl acrylate, and 2-ethylhexyl acrylate may be used.

The units derived from an alkyl methacrylate monomer and selectively the units derived from an alkyl acrylate monomer, constituting the (A) seed may be used in an amount of 4 to 30 wt %, preferably, 4 to 20 wt %, more preferably, 4 to 15 wt % based on the total weight of the graft copolymer. Within this range, a graft copolymer having excellent impact resistance, weather resistance, balance of physical properties, etc. may be prepared.

The average particle diameter ($D_{50}$) of the seed obtained in the preparation step of the seed may be 30 to 70 nm, preferably 30 to 60 nm. Within this range, the appearance characteristics and impact resistance of a resin molded article using the graft copolymer may be excellent.

In the present invention, an acrylic compound including an unsaturated vinyl group and capable of playing the role of a crosslinking agent may be used as a crosslinking agent. For example, one or more selected from the group consisting of polyethylene glycol diacrylate, polyethylene glycol dimethacrylate, polypropylene glycol diacrylate, polypropylene glycol dimethacrylate, ethylene glycol diacrylate, ethylene glycol dimethacrylate, divinylbenzene, diethylene glycol dimethacrylate, triethylene glycol dimethacrylate, 1,3-butanediol dimethacrylate, hexanediol propoxylate diacrylate, neopentyl glycol dimethacrylate, neopentyl glycol ethoxylate diacrylate, neopentyl glycol propoxylate diacrylate, trimethylolpropane trimethacrylate, trimethylolmethane triacrylate, trimethylpropane ethoxylate triacrylate, trimethylpropane propoxylate triacrylate, pentaerythritol ethoxylate triacrylate, pentaerythritol propoxylate triacrylate and vinyltrimethylsilane, may be used, without limitation.

The crosslinking agent may be used in an amount of 0.01 to 3 parts by weight, 0.01 to 1 parts by weight, 0.05 to 1 parts by weight, 0.01 to 0.5 parts by weight, or 0.1 to 0.5 parts by weight, based on total 100 parts by weight of the monomers used for the preparation of the graft copolymer.

In the present invention, a water-soluble initiator, a fat-soluble initiator, or a mixture thereof may be used as an initiator.

The water-soluble initiator may be, for example, one or more selected from the group consisting of sodium persulfate, potassium persulfate, ammonium persulfate, potassium perphosphate, and hydrogen peroxide, without limitation.

The fat-soluble initiator may be, for example, one selected from the group consisting of t-butyl peroxide, cumene hydroperoxide, p-methane hydroperoxide, di-t-butyl peroxide, t-butyl cumyl peroxide, acetyl peroxide, isobutyl peroxide, octanoyl peroxide, dibenzoyl peroxide, diisopropylbenzene hydroperoxide, 3,5,5-trimethylhexanol peroxide, t-butyl peroxy isobutyrate, azobis isobutyronitrile, azobis-2,4-dimethylvaleronitrile, azobiscyclohexanecarbonitrile, and methyl azobis isobutyrate, without limitation.

In the seed preparation step, a water-soluble initiator is preferably used. By controlling the reaction rate, a polymer having a desired size may be easily prepared, and effects of improving the physical properties of the graft copolymer may be achieved.

The initiator may be used in an amount of 0.01 to 3 parts by weight, preferably, 0.01 to 1 parts by weight, based on total 100 parts by weight of the monomers used for the preparation of the graft copolymer.

In the present invention, as an emulsifier, derivatives of the metal salt of C12-C18 alkyl sulfosuccinate, or derivatives of the metal salt of a C12-C20 alkyl sulfonic acid ester or sulfonic acid may be used. As the derivatives of the metal salt of C12-C18 alkyl sulfosuccinate, a sodium or potassium salt of dicyclohexyl sulfonate, or dihexylsulfosuccinate may be used, and as the metal salt of the sulfonic acid ester or sulfonic acid of C12-C20, a metal salt of alkyl sulfate such as sodium lauryl sulfate, sodium dodecyl sulfate, sodium dodecyl benzene sulfate, sodium octadecyl sulfate, sodium oleic sulfate, potassium dodecyl sulfate, and potassium octadecyl sulfate, may be used. In addition, as the emulsifier, derivatives of the metal salt of fatty acid of C12-C20, or the metal salt of carboxylic acid such as a metal salt of rosin acid, of which pH of an aqueous solution is 9-13, may be used. Examples of the metal salt of fatty acid may include a sodium salt or a potassium salt of fatty acid, lauryl acid and oleic acid, and examples of the metal salt of rosin acid may include sodium rosinate or potassium rosinate. The emulsifier may use along or as a mixture of two or more.

In the present disclosure, the derivative of a certain compound means a compound in which one or two or more hydrogen atoms or functional groups are substituted with another organic groups or inorganic groups.

The emulsifier may be used in an amount of 0.01 to 5 parts by weight, 0.01 to 3 parts by weight, 0.1 to 2 parts by weight, 0.1 to 1 parts by weight, or 0.5 to 1.5 parts by weight, based on total 100 parts by weight of the monomers used for the preparation of the graft copolymer.

In the preset invention, the electrolyte may be one or more selected from the group consisting of KCl, NaCl, KHCO$_3$, NaHCO$_3$, K$_2$CO$_3$, Na$_2$CO$_3$, KHSO$_3$, NaHSO$_3$, K$_4$P$_2$O$_7$, Na$_4$P$_2$O$_7$, K$_3$PO$_4$, Na$_3$PO$_4$, K$_2$HPO$_4$, Na$_2$HPO$_4$, KOH, NaOH, and Na$_2$S$_2$O$_7$, without limitation.

The electrolyte may be used in an amount of 0.0001 to 1 parts by weight, 0.001 to 1 parts by weight, or 0.05 to 1 parts by weight, based on total 100 parts by weight of the monomers used for the preparation of the graft copolymer, and within this range, the stability of polymerization reaction and latex may be improved.

In the present invention, a compound including two or more unsaturated vinyl groups having different reactivity may be used as a grafting agent. For example, the compound may be one or more selected from the group consisting of allyl methacrylate, triallyl isocyanurate, triallylamine and diallylamine, without limitation.

The grafting agent may be used in an amount of 0.01 to 3 parts by weight, 0.01 to 1 parts by weight or 0.01 to 0.1 parts by weight, based on total 100 parts by weight of the monomers used for the preparation of the graft copolymer, and within this range, the graft ratio of the graft copolymer may be improved.

The oxidation-reduction catalyst may be one or more selected from the group consisting of sodium pyrophosphate, dextrose, ferrous sulfide, sodium sulfite, sodium formaldehyde sulfoxylate, and sodium ethylenediaminetetraacetate, without limitation.

The oxidation-reduction catalyst may be used in an amount of 0.01 to 3 parts by weight based on total 100 parts by weight of the monomers used for the preparation of the graft copolymer.

Preparation of (B) Core

In the preparation step of the core, the core may be prepared by polymerizing an alkyl acrylate-based monomer, a crosslinking agent, an initiator and an emulsifier in the presence of the seed, or may be polymerized by selectively further adding one or more among an electrolyte, a grafting agent and an oxidation-reduction catalyst.

The alkyl acrylate monomer of the (B) core is not limited thereto, and may be one or more selected from the group consisting of methyl acrylate, ethyl acrylate, propyl acrylate, butyl acrylate, hexyl acrylate, octyl acrylate, and 2-ethylhexyl acrylate.

The units derived from an alkyl acrylate-based monomer which constitutes the (B) core may be used in an amount of 20 to 60 wt %, 30 to 60 wt % or 35 to 50 wt % based on the total weight of the graft copolymer. Within this range, a graft copolymer having excellent impact resistance, weather resistance, balance of physical properties may be prepared.

The core obtained from the preparation step of the core, that is, the core including the seed has an average particle diameter ($D_{50}$) of 40 to 90 nm, preferably, 40 to 80 nm, more preferably, 45 to 80 nm, further more preferably, 50 to 70 nm. If the average particle diameter of the core is less than 40 nm, impact strength may be deteriorated, and if the average particle diameter is greater than 90 nm, the improvement of weather resistance may be limited.

Particular examples and amounts of the crosslinking agent, initiator, emulsifier, electrolyte, grafting agent and oxidation-reduction catalyst, used in the preparation step of the core, may be the same as examined in the above-mentioned preparation step of the seed.

Preparation of (C) Shell

In the preparation step of the shell, the shell may be prepared by polymerizing one or more monomers among an aromatic vinyl-based monomer, a vinyl cyanide-based monomer and an alkyl methacrylate-based monomer, an initiator and an emulsifier in the presence of the core, and may be polymerized by selectively further adding one or more among a crosslinking agent, an electrolyte, a grafting agent, an oxidation-reduction catalyst, and a molecular weight controller.

It is preferable that the shell essentially includes an aromatic vinyl-based monomer and a vinyl cyanide-based monomer. In addition, an alkyl methacrylate monomer may be additionally included to improve the weather resistance and the appearance quality of the graft copolymer.

The aromatic vinyl-based monomer may be one or more selected from the group consisting of styrene, α-methylstyrene, p-methylstyrene and vinyltoluene, preferably, styrene.

The vinyl cyanide-based monomer may be one or more selected from the group consisting of acrylonitrile, methacrylonitrile and ethacrylonitrile, preferably, acrylonitrile.

The alkyl methacrylate monomer of the (C) shell may be alkyl methacrylate including a chain-type alkyl or branch-type alkyl group of 1 to 10 carbon atoms, preferably, methacrylate including a chain-type alkyl group of 1 to 4 carbon atoms. Particularly, one or more selected from the group consisting of methyl methacrylate, ethyl methacrylate, propyl methacrylate, butyl methacrylate, hexyl methacrylate, octyl methacrylate, and 2-ethylhexyl methacrylate may be used.

The units derived from one or more selected from the group consisting of the aromatic vinyl monomer, the vinyl cyanide-based monomer and the alkyl methacrylate monomer, which constitute the (C) shell, may be used in an amount of 20 to 60 wt %, 30 to 60 wt % or 35 to 50 wt % based on the total weight of the graft copolymer.

In an embodiment, the graft copolymer may include the units derived from the aromatic vinyl monomer in an amount of 20 to 40 wt %, preferably, 25 to 40 wt %, and the units derived from the vinyl cyanide-based monomer in an amount of 5 to 20 wt %, preferably, 10 to 20 wt %, based on the total weight of the graft copolymer. Within these ranges, the mechanical strength and appearance quality of the graft copolymer may be improved.

The average particle diameter ($D_{50}$) of the graft copolymer particles obtained from the shell preparation step may be 60 to 120 nm, preferably, 65 to 120 nm, more preferably, 65 to 110 nm. Within this range, the weather resistance and impact strength of the graft copolymer may become excellent.

The graft ratio of the shell may be 10 to 30%, preferably, 20 to 30% or 15 to 25%. If the shell graft ratio is 10% or less, impact and coloring properties may be degraded, and if the shell graft ratio is 30% or more, the improvement of weather resistance may be limited.

The graft ratio of the shell may be calculated by: monomer content of one or more units derived from aromatic vinyl-based monomer, vinyl cyanide-based monomer and alkyl methacrylate monomer, which are combined with the core/seed and core content*100(%).

For example, the graft ratio of the shell may be a value obtained by dissolving 1 g of a graft copolymer in acetone, separating gel and sol by means of a centrifuge (15000 rpm), drying a gel part in a vacuum oven, measuring the weight, and calculating an equation of (gel content−seed and core content)/seed and core content*100(%). The seed and core content may be calculated by multiplying a graft copolymer and the fraction of a seed and core in the graft copolymer.

Particular examples of the crosslinking agent, initiator, emulsifier, electrolyte, grafting agent and oxidation-reduction catalyst, which are used in the preparation step of the shell, may be the same as examined in the above-mentioned preparation step of the seed.

Preferably, a fat-soluble initiator may be used in the preparation step of the shell. By using the fat-soluble initiator, a high polymerization degree may be achieved, and the productivity of a resin may be increased.

In addition, the preparation step of the shell may be performed by further including a molecular weight controller. For example, mercaptan compounds such as tertiary dodecyl mercaptan may be used, without limitation.

The molecular weight controller may be used in an amount of 0.01 to 2 parts by weight, 0.05 to 2 parts by weight or 0.05 to 1 parts by weight based on total 100 parts by weight of the monomers used for the preparation of the graft copolymer. Within this range, a polymer having a desired size may be easily prepared.

With respect to the graft copolymer latex obtained through the preparation steps of the seed, core and shell, common processes such as agglomerating, washing, drying, etc. may be performed to obtain a graft copolymer with a powder shape. In an embodiment, a metal salt or an acid may be added to the graft copolymer latex to agglomerate in temperature conditions of 60 to 100° C., and then, aging, dehydrating, washing and drying processes may be performed, without limitation.

Other conditions unspecified in the preparation method of the graft copolymer, for example, polymerization conversion ratio, reaction pressure, reaction time, gel content, etc., are not specifically limited within the commonly used ranges in the technical field of the present invention, and may be appropriately selected and used as necessary.

Thermoplastic Resin Composition

Another embodiment of the present invention provides a thermoplastic resin composition comprising the graft copolymer; and an aromatic vinyl-vinyl cyanide-based copolymer.

The thermoplastic resin composition may be prepared by including a step of mixing the graft copolymer and an aromatic vinyl-vinyl cyanide-based copolymer and then, extruding and kneading.

For example, the extrusion may be performed in conditions of 200 to 300° C. and 30 to 100 rpm, or 200 to 280° C. and 30 to 70 rpm, and within these ranges, a thermoplastic resin composition having excellent processability and desired physical properties may be prepared.

The additionally added aromatic vinyl-vinyl cyanide-based copolymer may be a commonly used one. For example, the aromatic vinyl-based monomer may be one or more selected from the group consisting of styrene, α-methylstyrene, methylstyrene and vinyltoluene, preferably, styrene.

The vinyl cyanide-based monomer is one or more selected from the group consisting of acrylonitrile, methacrylonitrile and ethacrylonitrile, preferably, acrylonitrile.

In addition, the aromatic vinyl-vinyl cyanide-based copolymer may further include the units derived from an alkyl (meth)acrylate monomer. The alkyl (meth)acrylate monomer may be alkyl (meth)acrylate including a chain-type alkyl or branch-type alkyl group of 1 to 10 carbon atoms, preferably, (meth)acrylate including a chain-type alkyl group of 1 to 4 carbon atoms.

Preferably, the alkyl (meth)acrylate monomer may be one or more selected from the group consisting of methyl methacrylate, ethyl methacrylate, propyl methacrylate, butyl methacrylate, hexyl methacrylate, octyl methacrylate, and 2-ethylhexyl methacrylate.

In addition, the additionally added alkyl (meth)acrylate monomer may be provided as a copolymer with the aromatic vinyl-based monomer and the vinyl cyanide-based monomer, or as a single polymer.

The aromatic vinyl-vinyl cyanide-based copolymer may include 60 to 85 wt % of the units derived from the aromatic vinyl-based monomer and 15 to 40 wt % of the units derived from the vinyl cyanide-based monomer, based on the total weight of the copolymer. Within these ranges, the mechanical strength, weather resistance and appearance quality of a final thermoplastic resin composition may be excellent.

In addition, the thermoplastic resin composition of the present invention may include the graft copolymer in an amount of 20 to 60 wt %, preferably, 30 to 60 wt %, more preferably, 40 to 50 wt %, and the aromatic vinyl-vinyl cyanide-based copolymer in an amount of 40 to 80 wt %, preferably, 40 to 70 wt %, more preferably, 50 to 60 wt %, based on the total weight of the resin composition. Within these ranges, advantages of excellent mechanical properties, appearance quality and processability may be achieved.

During preparing the thermoplastic resin composition, one or more selected from the group consisting of a flame retardant, a lubricant, an antimicrobial agent, a releasing agent, a nucleating agent, a plasticizer, a thermal stabilizer, an antioxidant, a photo stabilizer, a pigment, a dye, and a compatibilizer may be further added.

The additive may be added in an amount of 0.1 to 10 parts by weight, preferably, 1 to 7 parts by weight, more preferably, 1 to 5 parts by weight, based on total 100 parts by weight of the thermoplastic resin composition. Within this range, the effects of the additives may be shown without deteriorating the inherent physical properties of a resin.

The thermoplastic resin composition may have a color change value (ΔE) measured after standing for 5000 hours based on WOM SAE J1960 for evaluating weather resistance, of 3 or less, preferably, 1 to 2.5.

In addition, a black color degree (L) value measured using a spectrophotometer with respect to the thermoplastic resin composition may be 26.6 or less, preferably, 26.0 or less.

In addition, izod impact strength measured based on ASTM 256 with respect to the thermoplastic resin composition may be 7 to 9 kgf·cm/cm, preferably, 8 to 9 kgf·cm/cm.

Thermoplastic Resin Molded Article

The thermoplastic resin composition of the present invention may form a thermoplastic resin molded article through a thermal molding process such as extrusion.

In an embodiment, the extrusion may be performed at a temperature of 190 to 300° C. or 200 to 250° C. and a pressure of to 80 bars or 30 to 70 bars. Within these ranges, excellent processability and desired mechanical properties and appearance characteristics may be achieved.

Other conditions unspecified in the thermoplastic graft copolymer resin composition and molded article are not specifically limited only if within commonly applied ranges in the technical field of the present invention, and may be appropriately selected as necessary.

Hereinafter, preferred embodiments will be suggested to assist the understanding of the present invention, but the embodiments are only illustrations of the present invention, and a person skilled in the art may apparently change and modify into various other types within the scope and technical spirit of the present invention. Such changes and modifications are definitely included in the attached claims.

MODE FOR CARRYING OUT THE INVENTION

Examples

Example 1

<Formation of Seed (A)>

To a nitrogen-substituted reactor, 20 parts by weight of methyl methacrylate, 2.0 parts by weight of sodium dodecylsulfate, 0.1 parts by weight of ethylene glycol dimethacrylate, 0.1 parts by weight of allyl methacrylate and 0.1 parts by weight of potassium hydroxide were injected in a lump, and the temperature was elevated to 70° C. Then, 0.1 parts by weight of potassium persulfate was added thereto to initiate the reaction. After that, polymerization was performed for 1 hour.

After finishing the reaction, the average size of the rubber polymer particles thus obtained was confirmed to be 48 nm as the result of measurement by the method below.

Measurement of average particle diameter: 1 g of a polymer latex and 100 g of distilled water were mixed, and the average particle diameter was measured by a dynamic laser light scattering method using Nicomp 380HPL (U.S., PSS•Nicomp Co.) in Gaussian mode.

<Formation of Core (B)>

To the polymer seed, a mixture of 40 parts by weight of butyl acrylate, 0.5 parts by weight of sodium dodecylsulfate, 0.25 parts by weight of ethylene glycol dimethacrylate, 0.25 parts by weight of allyl methacrylate and 0.1 parts by weight of potassium persulfate was continuously injected at 70° C. for 2.0 hours. After finishing the injection, polymerizing was performed further for 1 hour.

After finishing the reaction, the average size of the rubber polymer particles thus obtained was found 70 nm.

<Formation of Graft Shell (C)>

In the presence of the polymer core, each of an emulsification solution including a monomer mixture of 28 parts by weight of styrene and 12 parts by weight of acrylonitrile, 0.5 parts by weight of sodium dodecylsulfate, 0.1 parts by weight of tertiary dodecyl mercaptan (TDDM) and 0.05 parts by weight of cumene hydroperoxide, and a mixture solution including 0.09 parts by weight of sodium pyrophosphate, 0.12 parts by weight of dextrose, and 0.002 parts by weight of ferrous sulfate, was continuously injected at 75° C. for 3 hours while performing polymerization reaction. To increase a polymerization conversion ratio, after finishing the injection of the emulsification solution and the mixture solution, the reaction was further performed at 75° C. for 1 hour and then cooled to 60° C. The polymerization reaction was finished to prepare graft copolymer latex.

The average size of the final particles of the graft copolymer latex thus obtained was 88 nm, and the graft ratio thereof was 25%.

The graft ratio was obtained by dissolving 1 g of the graft copolymer in acetone, separating sol and gel by means of a centrifuge (15000 rpm), drying a gel part in a vacuum oven and measuring a weight. The grafted amount of the shell was calculated by subtracting the seed and core content from the measured gel content, and the grafted amount was divided by the total content of the seed and core to obtain the graft ratio into a percentage.

<Formation of Graft Copolymer Powder>

To the graft copolymer latex thus prepared, 0.8 parts by weight of an aqueous calcium chloride solution was applied, and atmospheric agglomeration was performed at 70° C. Aging at 93° C., dehydration and washing, and drying at 90° C. with hot air for 30 minutes were performed to obtain a graft copolymer powder.

<Formation of Thermoplastic Resin Composition>

50 parts by weight of the graft copolymer powder, 50 parts by weight of a hard matrix styrene-acrylonitrile copolymer (30 wt % of acrylonitrile and 70 wt % of styrene), 1.5 parts by weight of a lubricant, 1.0 parts by weight of an antioxidant, and 1.0 part by weight of a ultraviolet stabilizer were added and mixed. The mixture was manufactured into a pellet shape using a 36 pi extruding kneader at the cylinder temperature of 220° C., and a resin having the pellet shape was extruded (extrusion temperature of 200 to 230° C., and extrusion pressure of 40 to 60 bar) to manufacture a specimen for measuring physical properties.

Example 2

The same procedure as Example 1 was performed except for preparing a graft copolymer having an average particle diameter of (B) of 50 nm by using 3.0 parts by weight of sodium dodecyl sulfate in the preparation step of the polymer seed in Example 1.

Example 3

The same procedure as Example 1 was performed except for using (A) and (B) at the amounts described in Table 1 below in Example 1.

Example 4

The same procedure as Example 1 was performed except for using (C) as the component at the amount described in Table 1 below in Example 1.

Example 5

The same procedure as Example 1 was performed except for using (A) as the component at the amount described in Table 1 below in Example 1.

Example 6

The same procedure as Example 1 was performed except for using 30 parts by weight of a hard matrix styrene-acrylonitrile copolymer (30 wt % of acrylonitrile and 70 wt % of styrene) and 20 parts by weight of a methyl methacrylate polymer in the preparation step of the thermoplastic resin composition in Example 1.

Comparative Example 1

The same procedure as Example 1 was performed except for preparing a graft copolymer having an average particle diameter of (B) of 100 nm by using 0.5 parts by weight of sodium dodecyl sulfate in the preparation step of the polymer seed in Example 1.

Comparative Example 2

The same procedure as Example 1 was performed except for preparing a graft copolymer having an average particle diameter of (B) of 35 nm by using 5 parts by weight of sodium dodecyl sulfate and each component of (A), (B) and (C) at the amounts described in Table 1 in the preparation step of the polymer seed in Example 1.

Comparative Example 3

The same procedure as Example 1 was performed except for preparing a graft copolymer having the graft ratio of a shell of 5% by using 3 parts by weight of sodium dodecyl sulfate and each component of (B) and (C) at the amounts described in Table 1 in the preparation step of the polymer seed in Example 1.

Comparative Example 4

The same procedure as Example 1 was performed except for preparing a graft copolymer having the graft ratio of a shell of 40% by using each component of (A), (B) and (C) at the amounts described in Table 1 in the preparation step of the polymer seed in Example 1.

Comparative Example 5

The same procedure as Example 1 was performed except for using a component of (A) as the component described in Table 1 in Example 1.

TABLE 1

| Division | | Example | | | | | | Comparative Example | | | | |
|---|---|---|---|---|---|---|---|---|---|---|---|---|
| | | 1 | 2 | 3 | 4 | 5 | 6 | 1 | 2 | 3 | 4 | 5 |
| (A) | Component | MMA | MMA | MMA | MMA | MMA/BA | MMA | MMA | MMA | MMA | MMA | BA |
| | Amount (parts by weight) | 20 | 20 | 15 | 20 | 15/5 | 20 | 20 | 5 | 20 | 10 | 20 |
| | Average particle diameter (nm) | 48 | 35 | 42 | 48 | 48 | 48 | 70 | 20 | 45 | 40 | 48 |
| (B) | Component | BA | BA | BA | BA | BA | BA | BA | BA | BA | BA | BA |
| | Amount (parts by weight) | 40 | 40 | 50 | 40 | 40 | 40 | 40 | 30 | 60 | 40 | 40 |
| | Average particle diameter (nm) | 70 | 50 | 70 | 70 | 70 | 70 | 100 | 35 | 70 | 70 | 70 |
| (C) | Component | SN/AN | SN/AN | SN/AN | SN/AN/MMA | SN/AN | SN/AN | SN/AN | SN/AN | SN/AN | SN/AN | SN/AN |
| | Amount (parts by weight) | 28/12 | 28/12 | 28/12 | 18/12/10 | 28/12 | 28/12 | 28/12 | 45/20 | 14/6 | 35/15 | 28/12 |
| | Average particle diameter (nm) | 90 | 60 | 80 | 88 | 91 | 92 | 120 | 60 | 80 | 90 | 90 |
| | Graft ratio (%) | 25 | 20 | 15 | 20 | 25 | 25 | 25 | 20 | 5 | 40 | 25 |

Experimental Examples

The physical properties of ASA-based graft copolymers prepared according to the Examples and the Comparative Examples and thermoplastic resin compositions including the same were measured by methods described below, and the results are listed in Table 2 below.

1) Weather Resistance (ΔE)

Color values were measured after standing for 5000 hours based on SAE J1960 using weather-o-meter (ATLAS Co. Ci35A), and the degree of color change (ΔE) was obtained by comparing with initial color values according to Mathematical Equation 1 below. Here, ΔE is the arithmetical mean of CIE Lab values before and after weather resistance experiment, and if the value closes to 0, the degree of color change is small and the weather resistance is good.

$$\Delta E = \sqrt{(L'-L)^2 + (a'-a)^2 + (b'-B)^2}$$ [Mathematical Equation 1]

(In Mathematical Equation 1, L, a and b are initial color values measured immediately after extrusion, and L', a and b' are color values measured after 5000 hours lapse.)

2) Resin Coloring Properties (L)

During processing a resin composition, 1 wt % of carbon black was added and an L value of a specimen for measuring coloring properties was measured using a color difference meter. If the L value decreases, dark black may be exhibited to serve good coloring properties.

3) Izod Impact Strength (Kgf·Cm/Cm)

With respect to a thermoplastic resin composition specimen with a thickness of ¼", impact strength was measured by a method of standard measurement ASTM 256.

TABLE 2

| Division | Example | | | | | | Comparative Example | | | | |
|---|---|---|---|---|---|---|---|---|---|---|---|
| | 1 | 2 | 3 | 4 | 5 | 6 | 1 | 2 | 3 | 4 | 5 |
| Weather resistance (ΔE) | 1.9 | 1.6 | 1.8 | 1.7 | 2.3 | 1.4 | 4.0 | 1.8 | 2.0 | 3.5 | 4.5 |
| Coloring properties (L) | 26.4 | 26.2 | 26.3 | 26.0 | 26.6 | 25.8 | 27.5 | 26.3 | 27.3 | 26.5 | 28.0 |
| Impact strength (kgf · cm/cm) | 8.5 | 7.2 | 8.1 | 8.3 | 8.7 | 7.1 | 8.3 | 3.5 | 3.8 | 8.3 | 8.2 |

In Table 2, the thermoplastic resin compositions including the AN-MMA-SN graft copolymers of Examples 1 to 6 were found to have excellent impact strength, appearance characteristics and weather resistance. On the contrary, Comparative Example 1, which had the average particle diameter of the core of greater than 90 nm, showed decreased weather resistance, and Comparative Example 2, which had the average particle diameter of the core of less than 30 nm, kept weather resistance and coloring properties but showed largely decreased impact strength. In addition, Comparative Example 3, which had the graft ratio of a shell of less than 10%, showed decreased coloring properties and impact strength, and Comparative Example 4, which had the graft ratio of greater than 30%, showed degraded weather resistance.

In addition, Comparative Example 5, which used butyl acrylate instead of methyl methacrylate in the seed, was found to show degraded weather resistance and coloring properties.

The invention claimed is:

1. A graft copolymer comprising:
   (A) a seed comprising units derived from an alkyl methacrylate monomer;
   (B) a core formed on the seed and comprising units derived from an alkyl acrylate monomer; and
   (C) a shell formed on the core and comprising units derived from one or more selected from the group consisting of an aromatic vinyl-based monomer, a vinyl cyanide-based monomer and an alkyl methacrylate monomer,
   wherein an average particle diameter of the core is 40 to 90 nm, and a graft ratio of the shell is 10 to 30%.

2. The graft copolymer of claim 1, wherein an average particle diameter of the seed is 30 to 70 nm.

3. The graft copolymer of claim 1, wherein the average particle diameter of the core is 50 to 70 nm.

4. The graft copolymer of claim 1, wherein the graft ratio of the shell is 15 to 25%.

5. The graft copolymer of claim 1, wherein the alkyl methacrylate monomer of the (A) seed is one or more selected from the group consisting of methyl methacrylate, ethyl methacrylate, propyl methacrylate, butyl methacrylate, hexyl methacrylate, octyl methacrylate, and 2-ethylhexyl methacrylate.

6. The graft copolymer of claim 1, wherein the (A) seed further comprises units derived from an alkyl acrylate monomer.

7. The graft copolymer of claim 6, wherein the alkyl acrylate monomer of the (A) seed is one or more selected from the group consisting of methyl acrylate, ethyl acrylate, propyl acrylate, butyl acrylate, hexyl acrylate, octyl acrylate, and 2-ethylhexyl acrylate.

8. The graft copolymer of claim 1, wherein the alkyl acrylate monomer of the (B) core is one or more selected from the group consisting of methyl acrylate, ethyl acrylate, propyl acrylate, butyl acrylate, hexyl acrylate, octyl acrylate, and 2-ethylhexyl acrylate.

9. The graft copolymer of claim 1, wherein the copolymer comprises:
   4 to 30 wt % of the (A) seed;
   20 to 60 wt % of the (B) core; and
   20 to 60 wt % of the (C) shell, with respect to a total weight of the copolymer.

10. A thermoplastic resin composition comprising:
    the graft copolymer according to claim 1; and
    an aromatic vinyl-vinyl cyanide-based copolymer.

11. The thermoplastic resin composition of claim 10, wherein the aromatic vinyl-vinyl cyanide-based copolymer further comprises units derived from an alkyl (meth)acrylate monomer.

12. The thermoplastic resin composition of claim 10, wherein the thermoplastic resin composition comprises:
    20 to 60 wt % of the graft copolymer; and
    40 to 80 wt % of the aromatic vinyl-vinyl cyanide-based copolymer, with respect to a total weight of the resin composition.

13. The thermoplastic composition of claim 10, wherein the thermoplastic composition has a color change value (ΔE) measured after standing for 5000 hours according to SAE J1960, is 3 or less.

14. A thermoplastic resin molded article comprising the thermoplastic resin composition of claim 10.

* * * * *